(12) United States Patent
Paulsen

(10) Patent No.: US 7,660,192 B2
(45) Date of Patent: Feb. 9, 2010

(54) SEISMIC STREAMER RECEIVER SELECTION SYSTEMS AND METHODS

(75) Inventor: Jens Olav Paulsen, Reistad (NO)

(73) Assignee: Western Geco L.L.C., Houston, TX (US)

( * ) Notice: Subject to any disclaimer, the term of this patent is extended or adjusted under 35 U.S.C. 154(b) by 636 days.

(21) Appl. No.: 11/127,546

(22) Filed: May 12, 2005

(65) Prior Publication Data

US 2006/0256654 A1    Nov. 16, 2006

(51) Int. Cl.
    *G01V 1/38* (2006.01)
(52) U.S. Cl. .......................................... 367/19; 367/16
(58) Field of Classification Search ............. 367/15–20; 181/108–112
    See application file for complete search history.

(56) References Cited

U.S. PATENT DOCUMENTS

| | | | |
|---|---|---|---|
| 3,931,608 A | 1/1976 | Cole | |
| 3,990,036 A | 11/1976 | Savit | |
| 3,996,553 A | 12/1976 | Siems et al. | |
| 4,005,273 A | 1/1977 | Siems | |
| 4,023,140 A | 5/1977 | Siems et al. | |
| 4,031,504 A | 6/1977 | Mioduski | |
| 4,031,506 A | 6/1977 | Siems | |
| 4,033,278 A | 7/1977 | Waters | |
| 4,068,208 A | 1/1978 | Rice, Jr. et al. | |
| 4,072,923 A | 2/1978 | Siems et al. | |
| 4,092,629 A | 5/1978 | Siems et al. | |
| 4,117,448 A | 9/1978 | Siems | |
| 4,306,313 A | 12/1981 | Baldwin | |
| 4,463,701 A | 8/1984 | Pickett et al. | |
| 4,538,251 A | 8/1985 | Steetle | |
| 4,696,060 A | 9/1987 | Oswald | |
| 4,726,315 A * | 2/1988 | Bell et al. | 114/244 |
| 4,729,333 A | 3/1988 | Kirby et al. | |
| 4,781,140 A * | 11/1988 | Bell et al. | 114/244 |
| 4,809,005 A | 2/1989 | Counselman, III | |
| 4,870,626 A | 9/1989 | Tveit | |
| 4,890,568 A | 1/1990 | Dolengowski | |
| 4,912,682 A | 3/1990 | Norton, Jr. et al. | |
| 4,992,990 A * | 2/1991 | Langeland et al. | 367/19 |

(Continued)

FOREIGN PATENT DOCUMENTS

GB    2438426 A  * 11/2007

OTHER PUBLICATIONS

UK Search Report dated Sep. 18, 2006, for Application No. GB 0610418.6.

*Primary Examiner*—Jack W. Keith
*Assistant Examiner*—Krystine Saito
(74) *Attorney, Agent, or Firm*—Henry L. Ehrlich; Richard V. Wells; Kevin McEnaney

(57) ABSTRACT

Systems and methods for determining inline skew of one or more seismic streamers are disclosed. One system embodiment includes a seismic streamer including a plurality of receivers, a skew detector adapted to detect inline skew of the streamer, and a receiver selector adapted to select which receivers in the streamer to use in data acquisition based on the detected streamer inline skew. It is emphasized that this abstract is provided to comply with the rules requiring an abstract, which will allow a searcher or other reader to quickly ascertain the subject matter of the technical disclosure. It is submitted with the understanding that it will not be used to interpret or limit the scope or meaning of the claims.

22 Claims, 5 Drawing Sheets

U.S. PATENT DOCUMENTS

| | | |
|---|---|---|
| 5,353,223 A | 10/1994 | Norton et al. |
| 5,373,367 A | 12/1994 | DeGunther et al. |
| 5,443,027 A | 8/1995 | Owsley et al. |
| 5,450,370 A * | 9/1995 | Beasley et al. .............. 367/53 |
| 5,532,975 A | 7/1996 | Elholm |
| 6,005,828 A | 12/1999 | Carroll et al. |
| 6,011,752 A | 1/2000 | Ambs et al. |
| 6,137,793 A | 10/2000 | Gorman et al. |
| 6,178,363 B1 | 1/2001 | McIntyre et al. |
| 6,188,962 B1 * | 2/2001 | Morgan et al. .............. 702/14 |
| 6,205,400 B1 | 3/2001 | Lin |
| 6,430,105 B1 | 8/2002 | Stephen |
| 6,493,636 B1 | 12/2002 | DeKok |
| 6,567,579 B2 | 5/2003 | Foltzer |
| 6,691,038 B2 * | 2/2004 | Zajac ..................... 702/14 |
| 6,842,562 B2 | 1/2005 | Kinoshita et al. |
| 7,400,552 B2 * | 7/2008 | Moldoveanu et al. ......... 367/16 |
| 7,466,632 B1 * | 12/2008 | Sorli ..................... 367/153 |
| 2002/0084568 A1 | 7/2002 | Codde et al. |
| 2002/0089896 A1 | 7/2002 | Behrens et al. |
| 2003/0024792 A1 | 2/2003 | Yoshida et al. |
| 2003/0117025 A1 * | 6/2003 | Rouquette ................. 307/147 |
| 2003/0208320 A1 * | 11/2003 | Zajac ..................... 702/14 |
| 2004/0037165 A1 * | 2/2004 | Lemenager et al. ........... 367/37 |
| 2004/0073373 A1 | 4/2004 | Wilson |
| 2005/0219948 A1 * | 10/2005 | Naess ..................... 367/20 |
| 2006/0186889 A1 * | 8/2006 | Andreis ................... 324/345 |
| 2006/0256654 A1 * | 11/2006 | Paulsen ................... 367/20 |

* cited by examiner

SEISMIC STREAMER RECEIVER SELECTION SYSTEMS AND METHODS

BACKGROUND OF THE INVENTION

1. Field of Invention

The present invention relates to the field of marine seismic data acquisition systems and methods of using same. More specifically, the invention relates to systems and methods for selecting receivers on seismic streamers to use during a seismic data survey.

2. Related Art

Marine seismic exploration investigates the structure and character of subsurface strata under a body of water. In order to economically gather marine seismic data for large survey areas, one or more seismic vessels in a fleet may tow one or more seismic sources and multiple seismic streamer cables through the water. Streamers typically vary in length between three and twelve kilometers. Receivers are positioned along each streamer. The in-line interval between each receiver may range from about 3 and 25 meters, with 12.5 meters comprising typical interval spacing, although this spacing is tending to become less as clients demand more and higher quality data. Recent marine seismic surveys may employ receivers about 3 meters apart. Despite the best efforts of streamer and vessel steering devices and sometimes complicated computer algorithms, external forces, such as winds, tides, ocean currents, and the like, may affect the position of streamers and receivers. The term "skew" is sometimes used to describe a streamer or receiver following a non-desired path, possibly due to one or more external forces. One type of skew is "inline skew", which may be explained as a streamer positioned forward or aft of its desired position, although generally inline. If a particular streamer of a towed spread is fore or aft of its neighbor, the data may not be entirely acceptable, even though an identical configuration in terms of number of streamers, number of receivers, and even inline path, is followed. The problem is compounded, of course, if more than one streamer is experiencing inline skew.

From the above it is evident that there is a need for correcting for inline skew of towed seismic streamers.

SUMMARY OF THE INVENTION

In accordance with the present invention, systems and methods are described for dynamically selecting and/or de-selecting receivers in seismic streamers for correcting for inline skew during a seismic survey. The systems and methods of the invention reduce or overcome problems with previous systems and methods. Systems and methods of the invention may be used to collect marine seismic data, for example 3-D and 4-D marine seismic data.

A first aspect of the invention is a system comprising:
  (a) a seismic streamer including a plurality of receivers;
  (b) a skew detector adapted to detect inline skew of the streamer; and
  (c) a receiver selector adapted to select which receivers in the streamer to use in data acquisition based on the detected inline skew.

The streamer may have N normal receivers and M redundant receivers, and the M redundant receivers may be split between M1 receivers at the front of the streamer and M2 receivers at the tail end of the streamer, where M1 may or may not be equal to M2. Systems of the invention may comprise multiple streamers. The skew detector may be included in a streamer positioning system, such as an acoustic ranging network, which may include components of a Global Positioning System (GNSS), magnetic compasses, inertial devices such as accelerometers, and combinations thereof. An acoustic ranging network may employ one or more positioning streamers, which may be shorter than the seismic streamer, and one of the GNSS receivers may be stationed at the tail of the positioning streamer. The receiver selector may be adapted to select which receiver in the streamer is the first receiver. The streamer or streamers may include sufficient acoustic transmitters and receivers to perform acoustic ranging. The skew detector may include one or more skew sensors, which may be optical, photoelectric, or acoustic.

Another aspect of the invention comprises methods of determining skew of seismic streamers, one method comprising:
  (a) towing a seismic streamer having receivers;
  (b) sensing inline skew of at least a portion of the streamer; and
  (c) using the sensed inline skew to select which receivers to use in seismic data acquisition.

Methods of the invention may comprise wherein multiple streamers are towed, and one or more of the streamers may be a positioning streamer. The sensing of skew may be included within methods of sensing streamer position, such as acoustic positioning methods. The sensing of skew may occur at a higher sampling rate than the sensing of position, and skew sensing may be continuous. The streamers may be towed in configurations (viewed in a vertical cross-line plane) selected from over/under, W-configuration, V-configuration, and other horizontal and vertical off-set configurations. Selecting which receivers to use in data acquisition may include selecting which receiver is first, or last in the streamer, or in each streamer of a multiple streamer towing arrangement. Selecting which receiver to use may also comprise selecting a redundant or spare receiver in at least one streamer to be first (and/or last) receiver. When the sensing of skew occurs at a high sample rate or continuously, the selecting of which receiver to use may also occur at a high sample rate or continuously.

Methods of the invention may include sensing earth-based position of the seismic streamer and/or a positioning streamer through use of GNSS receivers spaced as desired in the spread, which may be regularly or randomly spaced. One method embodiment comprises sensing position of the seismic streamer or streamers using one or more positioning streamers containing several GNSS units, for example a GNSS unit every 1000 meters, rather than just one near the front and one near the tail, and using skew sensors to modify, enhance, or provide a check on the GNSS position determination, or vice versa. GNSS stands for Global Navigation Satellite System and has become a common term used for systems like GNSS, GLONASS, Galileo, etc, and combinations thereof.

Another method of the invention comprises:
  (a) towing two or more seismic streamers, each streamer having a plurality of receivers; and
  (b) selecting receivers from which to acquire seismic data based on relative position of the receivers.

Methods within this aspect of the invention include those methods wherein one or more receivers in separate streamers are selected to be first receiver in each streamer, and/or last in each streamer, depending on their position relative to each other. For example, it may be desired to acquire data from 10 receivers aligned in the crossline direction, or aligned in a line angled from crossline direction, where "crossline direction"

means Y direction, generally perpendicular to the inline X direction (generally the direction in which the spread is towed).

Systems and methods of the invention will become more apparent upon review of the brief description of the drawings, the detailed description of the invention, and the claims that follow.

BRIEF DESCRIPTION OF THE DRAWINGS

The manner in which the objectives of the invention and other desirable characteristics can be obtained is explained in the following description and attached drawings in which.

Figure 1:
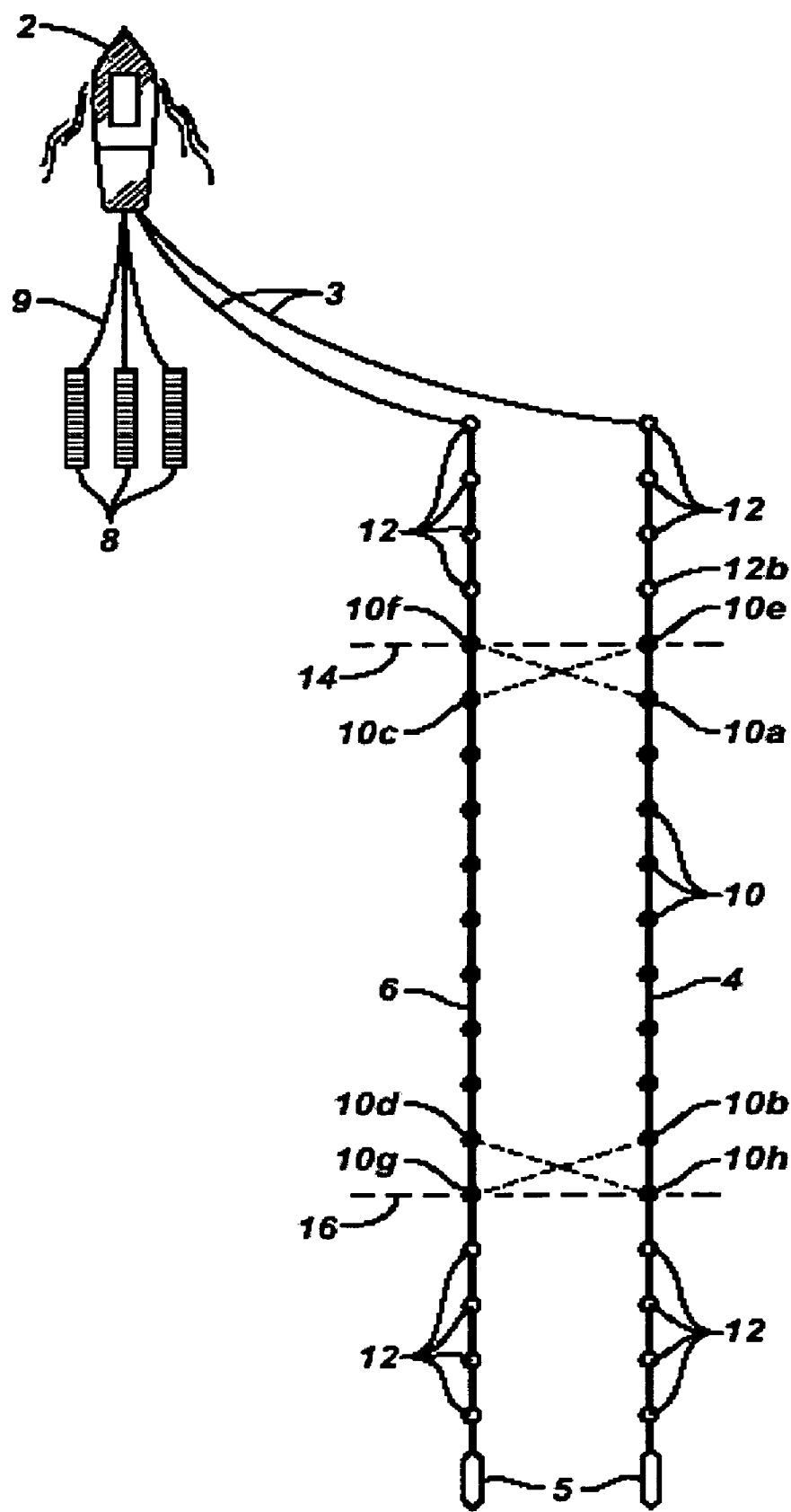
FIGS. 1 and 2 illustrate a first towing arrangement making use of a method and system of the invention.

It is to be noted, however, that the appended drawings are not to scale and illustrate only typical embodiments of this invention, and are therefore not to be considered limiting of its scope, for the invention may admit to other equally effective embodiments.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible. For example, in the discussion herein, aspects of the invention are developed within the general context of detection of inline skew of seismic streamers and selecting which receivers to use, which may employ computer-executable instructions, such as program modules, being executed by one or more conventional computers. Generally, program modules include routines, programs, objects, components, data structures, and the like, that perform particular tasks or implement particular abstract data types. Moreover, those skilled in the art will appreciate that the invention may be practiced in whole or in part with other computer system configurations, including hand-held devices, personal digital assistants, multiprocessor systems, microprocessor-based or programmable electronics, network PCs, minicomputers, mainframe computers, and the like. In a distributed computer environment, program modules may be located in both local and remote memory storage devices. It is noted, however, that modification to the systems and methods described herein may well be made without deviating from the scope of the present invention. Moreover, although developed within the context of determining inline skew of seismic streamers, those skilled in the art will appreciate, from the discussion to follow, that the principles of the invention may well be applied to other aspects of seismic data acquisition. Thus, the systems and method described below are but illustrative implementations of a broader inventive concept.

All phrases, derivations, collocations and multiword expressions used herein, in particular in the claims that follow, are expressly not limited to nouns and verbs. It is apparent that meanings are not just expressed by nouns and verbs or single words. Languages use a variety of ways to express content. The existence of inventive concepts and the ways in which these are expressed varies in language-cultures. For example, many lexicalized compounds in Germanic languages are often expressed as adjective-noun combinations, noun-preposition-noun combinations or derivations in Romanic languages. The possibility to include phrases, derivations and collocations in the claims is essential for high-quality patents, making it possible to reduce expressions to their conceptual content, and all possible conceptual combinations of words that are compatible with such content (either within a language or across languages) are intended to be included in the used phrases.

In order to perform marine seismic surveys, one or more marine seismic streamers, each typically several kilometers long and containing a large number of hydrophones and associated electronic equipment distributed along its length, is towed at about 5 knots behind a seismic survey vessel, which also may tow one or more seismic sources comprising source members, typically air guns. Acoustic signals produced by the source members are directed down through the water into the earth beneath, where they are reflected from the various strata. The reflected signals may be received by the hydrophones in the streamers, digitized and then transmitted to the seismic survey vessel, where they may be recorded and at least partially processed with the ultimate aim of building up a representation of the earth strata in the area being surveyed. In recent years, seismic streamers have included acoustic ranging systems, wherein acoustic transmitters and receivers are stationed strategically in the streamers and dedicated to determining position of the streamers. One may speak of acoustic networks (or simply "nets") of transmitters and receivers placed, for example, at the mid-point of the streamers, thus forming a mid-point acoustic net, at the tail of the streamers forming a tail acoustic net, at the front of the streamers forming a front-end acoustic net, and/or quarter points of streamers, forming quarter point acoustic nets, and so on. Finally, if the acoustic positioning transmitters and receivers are placed generally throughout the streamers, one may speak of a so-called full-length acoustic net, which is in effect a single acoustic net. GNSS receivers stationed at the tow vessel and the end of the streamers on buoys help determine the earth-oriented position. However, due to the previously mentioned external forces, such as winds, tides, ocean currents, and the like, the position of streamers and receivers may be adversely affected. Moreover, one or more streamers may be affected to a greater or lesser extent than even its neighboring streamer(s). One or more streamers may become skewed. The present invention addresses the problem of inline skew of streamers.

The present invention relates to various systems and methods for selecting which receivers to use in collecting marine seismic data. In certain embodiments of the invention, inline skew of one or more seismic streamers may be detected, and this used to turn on, or use data from, one or more spare or redundant receivers in the streamers, and turn off, or not use, data from other receivers, to maintain a spread in accordance with survey specifications. Systems and methods of the invention may be used in marine seismology, including 3-D and 4-D seismology. Deployment of one or more streamers with or without the seismic recording hydrophones active in the streamer, and with acoustic ranging between streamers is contemplated, or any other commonly used position determination method, to detect inline skew. The inventive aspect is derived from providing one or more spare receivers for the seismic reflection signals. The spare receivers may be carried in or on spare or redundant streamer cable sections, although that is no required. Optionally, regardless of the cause of the inline skew, a higher density of GNSS control points throughout the spread may improve overall skew detection accuracy by decreasing the distance between these points. Another option is to deploy one or more dedicated positioning streamers, which may be the same length as or shorter than the seismic streamer. A shorter positioning streamer affords the option of having the tail end of the positioning streamer, where a GNSS control point may be located, situated at or near the mid area of either the main full length acoustic network or any of the possible mid networks in a multi-network spread.

Streamer constructions useful in the invention may comprise a large number of similar length streamer sections connected end-to-end, each section comprising a substantially cylindrical outer skin containing a pair of longitudinally extending strength members, typically ropes made of aramid fiber known under the trade designation KEVLAR™, to bear the towing forces. Acoustic transmitters and receivers may be substantially uniformly distributed along the length of the streamer, and may be interspersed with cylindrical spacers and foam elements that are mounted on the strength members. The foam elements may be saturated in use with kerosene or a similar fluid to render the streamers substantially neutrally buoyant. The streamer also may include electronics modules (or "bubbles") containing circuitry for digitizing the reflected seismic signals detected by the receivers and for transmitting the digitized signals to the seismic survey vessels, these modules typically being connected between adjacent streamer sections.

Another usable streamer construction comprises an elongate substantially solid core, at least one longitudinally extending strength member and a plurality of acoustic transmitters and receivers embedded in the core, a polymeric outer skin surrounding the core and defining there around an annular space, and polymeric foam material adapted to be substantially saturated with liquid and substantially filling the annular space. The acoustic transmitters and receivers may be encapsulated in capsules having at least one opening communicating with the annular space. The streamer may include a plurality of foam buoyancy elements, typically made from a skinned polymeric foam material such as skinned polypropylene foam, embedded in the core between the encapsulated hydrophones, and may further include a plurality of electronics modules each containing electronic circuitry for processing the signals produced by a plurality of the transmitter and receivers, the electronics modules being embedded in the core between them, along with electrical conductors for connecting the hydrophones to the electronics modules, electrical conductors for providing power to the electronics modules, electrical conductors for connecting the electronics modules to respective electro-optical conversion and multiplexing units connected in the streamer at intervals there along, and one or more optical fibers for interconnecting the electro-optical conversion and multiplexing units. The circuitry of each electronics module may be disposed within a cylindrical metal container, preferably of aluminum, which serves to shield the circuitry from external electrical interference. The digitized output signals may be converted into optical signals in the electronics bubbles, for multiplexing and high speed onward transmission via the optical fibers in the bundles to the vessel, where they are processed and recorded: thus it will be appreciated that the optical fibers serve to interconnect the electronics bubbles.

Depending on the embodiment in question, seismic streamers may be towed at depths ranging from about 3 to 20 meters below the surface of the water by means of a "lead-in", a reinforced electro-optical cable via which power and control signals are supplied to the streamer and seismic data signals are transmitted from the streamer back to the vessel, the vertical and/or horizontal position of the streamers being controlled by orientation members, or steerable "birds" distributed along the length of the streamer. Typically, the front end of the streamer is mechanically coupled to the lead-in by at least one vibration-isolating section (or "stretch section"), while the rear end is coupled to a tail buoy incorporating a GNSS position measuring receiver, typically via another "stretch section". If positioning streamers are used, as the positioning streamer(s) is/are a streamer not used to record seismic data, they may be placed anywhere where they are most useful, and they may be configured with multiple devices (like GNSS takeouts) that would otherwise be unacceptable anywhere except the front/tail of the spread due to noise on the seismic receivers in the seismic streamers.

Whatever the streamer construction used, in accordance with the invention the streamer may have one or more spare receivers in one or more spare or redundant streamer sections, which may be placed either at the front end, the tail end, or both ends of an otherwise normal length streamer. For example, in a 4D situation, if the previous surveys used 10 streamer sections in each streamer, each 100 meters long, one embodiment of the invention might employ 12 sections in each streamer, with each end section being a spare section with spare receivers.

Referring now to the figures, FIG. 1 illustrates schematically and not to scale a marine seismic tow vessel 2 towing two streamers 4 and 6 and a seismic source comprising three sub-arrays or air-guns 8. Note that ordinarily the front end of streamers 4 and 6 are towed further behind the source, but in order to illustrate the principles of the invention the figures may not reflect the actual towing arrangement. Further, the invention is not limited to use of two streamers and one source; seismic spreads using one or more streamers and one or more sources may benefit from the invention. Tow vessel 2 is connected to steamers 4 and 6 by tow cables 3, which may be active, strength-taking cables in the sense that they may transmit power to streamer steering devices (not shown) and receivers, and allow communication between such devices and tow vessel 2, or passive strength taking tow cables. Similarly, sub-arrays 8 are connected tow vessel 2 by tow cables 9. Streamers 4 and 6 may have tail buoys 5. Aside from showing the general configurations of seismic spreads, the tow vessel, tow cables, steering devices, buoys, and sources are not a part of the present invention, except those components necessary to carry out skew determination, and therefore are not further explained, these features being well known in the art.

In FIG. 1, multiple receivers that are actually in use gathering seismic data are shown as solid dots 10, while spare receivers, which may or may not be gathering seismic data, are generally indicated at 12 with open circles. In FIG. 1 the survey specification has called for receivers 10 to be positioned between dashed lines 14 and 16 relative to each other, and this configuration is in fact being met. Inline skew detection is indicated between receivers by oblique dashed lines, for example between receivers $10a$ and $10f$; $10c$ and $10e$; $10d$ and $10h$; and $10b$ and $10g$. Not all skew detectors need be used at all times. For example, skew detection may only be necessary at the fore or at the aft end of a streamer. Given this disclosure, those of even moderate skill will recognize many possible variations in position detection schemes in general, and skew detection schemes in particular. Acoustic ranging, short baseline (SBL) and ultrashort baseline (USBL) acoustic sensors, GNSS, magnetic compass, inertial motion sensors (accelerometers), and combinations thereof may be envisioned, as but a few examples. A controller and/or microprocessor on board vessel 2, or some other location may assist position detection. The term "controller" means a device at least capable of accepting input from sensors and meters in real time or near-real time, and sending commands directly to spread control elements, and/or to local devices associated with spread control elements able to accept commands. A controller may also be capable of accepting input from human operators; accessing databases, such as relational databases; sending data to and accessing data in databases, data warehouses or data marts; and sending information to and accepting input from a display device readable by a human. A controller may also interface with or have integrated therewith one or more software application modules, and may supervise interaction between databases and one or more software application modules.

Figure 2:
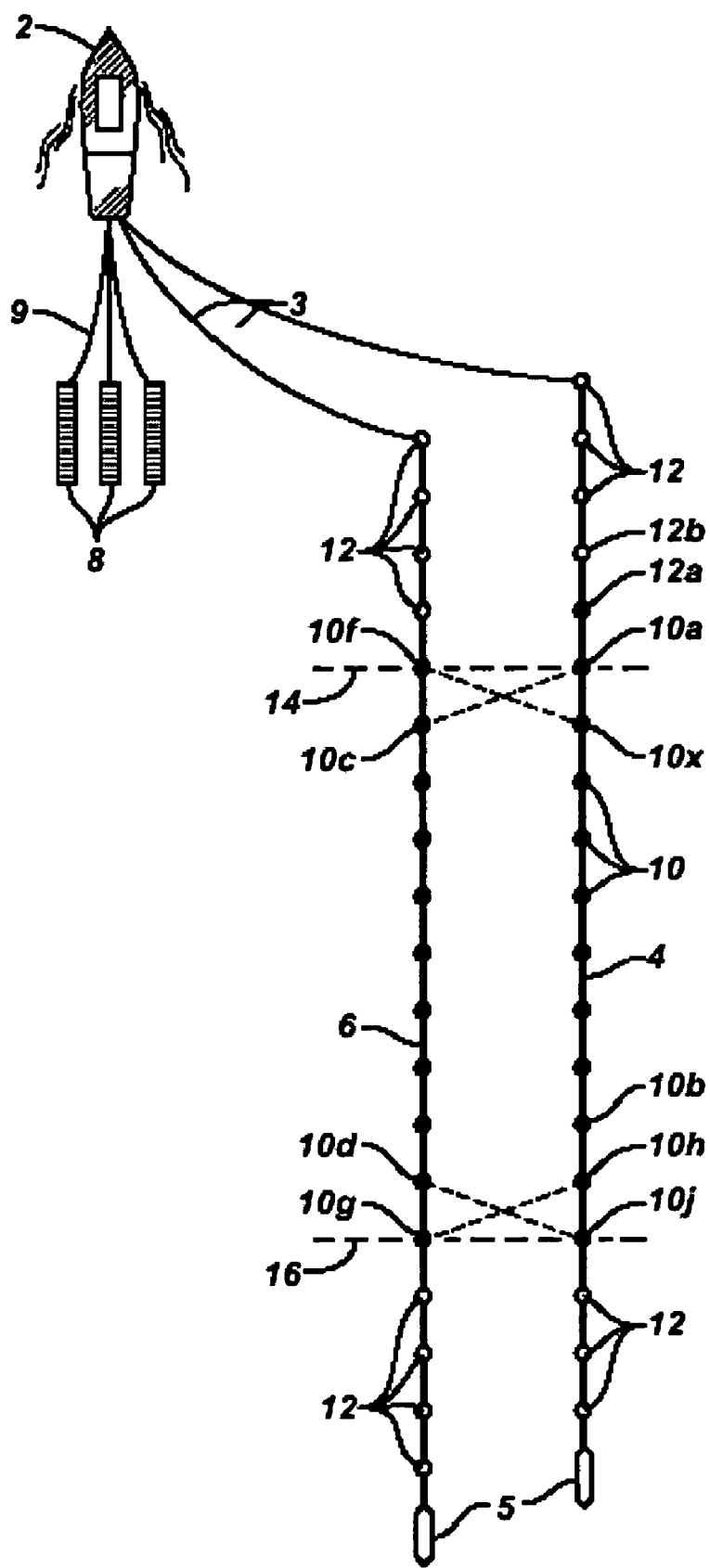

Now suppose that a forward inline skew, for example by external forces, is observed in streamer 4. This situation is depicted in FIG. 2, where the same reference numerals are used for the same objects, except where indicated. Specifically, note that the receiver that was formerly receiver 10*a* in FIG. 1 is now designated as receiver 12*a* by a circle with an "x" through the circle. Meanwhile, one spare receiver 12 in the tail section of streamer 4 has now become a useful seismic receiver 10*j*. Note that this maintains the seismic spread between dashed lines 14 and 16, and does not require repositioning or otherwise moving streamer 4 in relation to streamer 6. Skew detection may then proceed between receivers 10*g* and 10*h*; 10*d* and 10*j*, 10*f* and 10*x*; and 10*c* and 10*a*. Using computerized electronics, controllers, and skew detection, many of the operations described herein may happen in real-time or near-real-time. "Real-time", as used herein, means dataflow that occurs without any delay added beyond the minimum required for generation of the dataflow components. It implies that there is no major gap between the storage of information in the dataflow and the retrieval of that information. There may be a further requirement that the dataflow components are generated sufficiently rapidly to allow control decisions using them to be made sufficiently early to be effective. "Near-real-time" means dataflow that has been delayed in some way, such as to allow the calculation of results using symmetrical filters. Typically, decisions made with this type of dataflow are for the enhancement of real-time decisions. Both real-time and near-real-time dataflows are used immediately after the next process in the decision line receives them.

Figure 3:
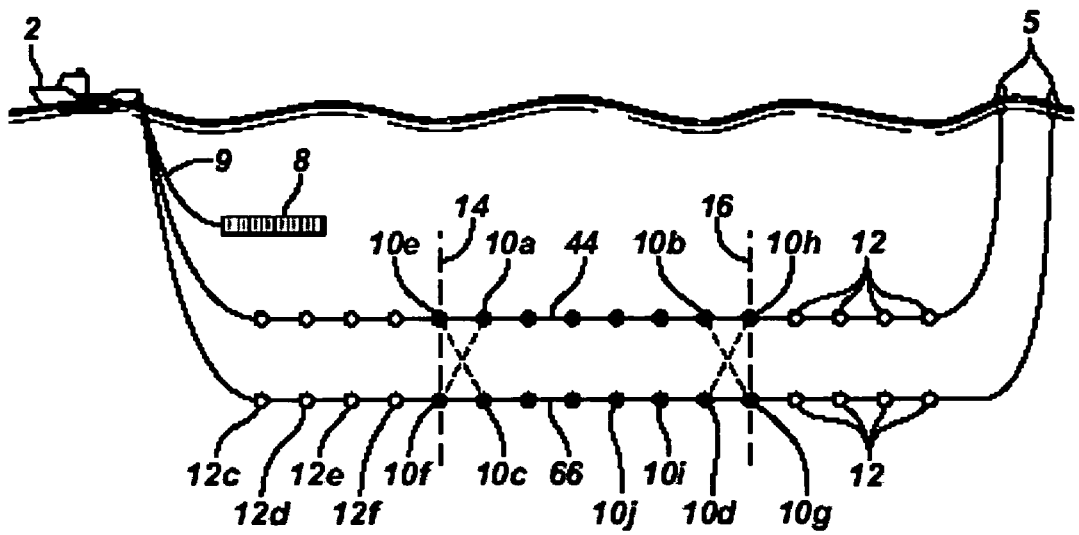
FIGS. 3 and 4 illustrate a second towing arrangement employing a method and system of the invention.
Figure 4:
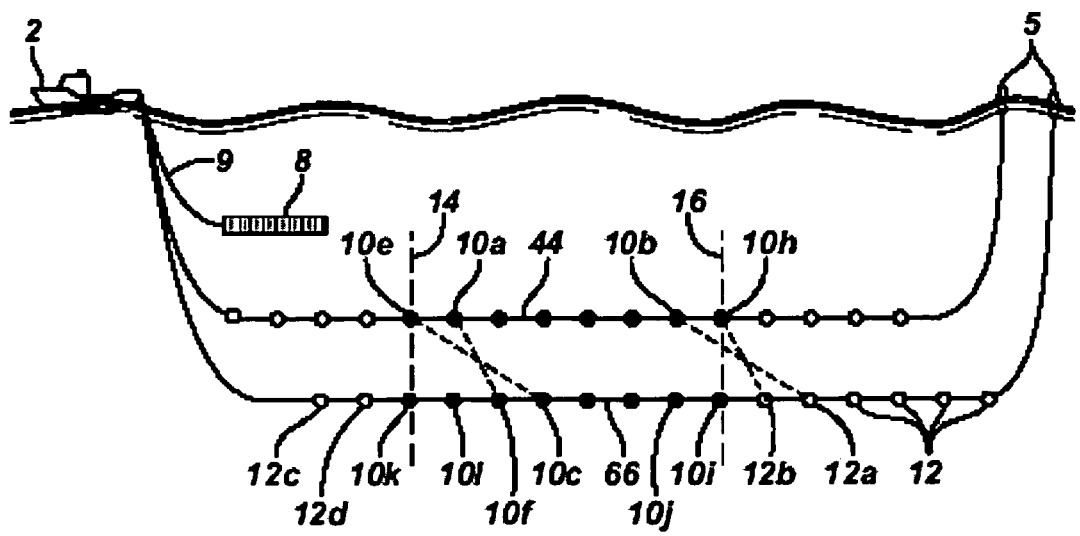

FIGS. 3 and 4 illustrate an over/under streamer tow configuration that may benefit from the principles of the invention, where streamer 44 is deployed at shallower depth than streamer 66. As noted earlier, energy from pulses generated by sub-arrays 8 propagates downwardly into the geological formations and is reflected upwardly from the interfaces between subsurface geological formations. This reflected energy may be accompanied by unwanted ghost signals reflected from other surfaces, and both wanted and unwanted signals are sensed with hydrophones attached to the seismic streamers. Controlling position of the streamers in over/under fashion may reduce ghosting. The streamers may be positioned using connectors between streamers, or by steerable birds, deflectors, steerable buoys, and the like. A combination of connectors and steerable birds may be used. For clarity and to illustrate the principles of the present invention, none of these are shown in FIGS. 3 and 4. As illustrated in FIG. 3, and similar to FIGS. 1 and 2, multiple receivers that are actually in use gathering seismic data are shown as solid dots, while spare receivers, which may or may not be gathering seismic data, are generally indicated at 12 with open circles. In FIG. 3 the survey specification has called for receivers 10 to be positioned between dashed lines 14 and 16, and this configuration is in fact being met. Position determination is indicated between receivers by oblique dashed lines, for example between receivers 10*a* and 10*f*; 10*c* and 10*e*; 10*d* and 10*h*; and 10*b* and 10*g*.

Now suppose that for some reason an aft inline skew is determined in streamer 66. This situation is depicted in FIG. 4. Due to the inline skew detected between receivers as depicted by dashed lines for example between receivers 10*e* and 10*c*, and receivers 10*a* and 10*f*, formerly useable receivers 10*d* and 10*g* in FIG. 3 are designated in FIG. 4 as spare receivers 12*a* and 12*b*, respectively, by circles with an "x" through each circle. These receivers are turned off or their data simply not used, and themselves become spare receivers. Meanwhile, formerly spare receivers 12*e* and 12*f* in the front section of streamer 66 have now become useful seismic receivers 10*k* and 10*l*. Note that this maintains the seismic spread between dashed lines 14 and 16, and does not require repositioning or otherwise moving streamer 66 in relation to streamer 44. Attempts to move streamer 66, for example forward using a streamer steering device or multiple steerable birds, for example, is not necessary. Skew detection may then proceed between receivers 10*g* and 10*h*; 10*d* and 10*j*, 10*f* and 10*x*; and 10*c* and 10*a*.

In the embodiment just described in relation to FIGS. 3 and 4, note that there may be more than one streamer pair 44/66, for example 44*a*/66*a*, 44*b*/66*b*, and so on. In these situations, it may be desirable to measure the position of neighboring streamers 44 in the plane that they are towed. In other words, it may be desirable to measure not only the inline skew of the de-ghosting streamer 66, but also the neighboring streamer 44*b*, in a manner similar to that described in reference to FIGS. 1 and 2.

Electromechanical components involved in switching between different receivers are known in the art, but they have not been employed as in the present invention. Some of these components might include a multiplexer switch sequenced by a control network, which is in turn connected to a streamer-positioning network, such as an acoustic network that includes acoustic sources and receivers (or transducers that both transmit and receive acoustic signals) to detect position such as inline skew. In response to signals from the receivers, which may be part of an acoustic positioning network or some other position sensing system, such as an inertial position sensing system, the positioning network may cause the control network to sequence the multiplexer, and send digital signals, or if analog sensors are used, to digitize the analog data from the inline skew sensor units, and to transmit a self-clocking digital word to a transmission channel through a data repeater network. Filters, gain conditioning amplifiers, digitizers and other electronics that are normally mounted in seismic streamers associated with a conventional seismic data acquisition system may be used. Data-processing electronics may be local or located in a central data acquisition system, and may be packaged in identical miniaturized streamer connector modules, one of which is associated with each streamer section. If the streamer sections are identical, the sections are spaced apart by and connected by a like plurality of identical connector modules. Digital or digitized analog signals from the inline skew sensor units within or on a streamer section may be fed via local data lines to a transceiver unit in the connector modules where they are filtered, multiplexed, sampled, gain conditioned and digitized if necessary. A central station, such as the tow vessel, may have a signal receiver and recorder to record digital data words received from the data transceivers through a data link and control logic to transmit control and interrogation pulses to the data transceivers through an interrogation link. Alternatively, so-called point transceivers may be used, such in a full streamer network.

Figure 5:
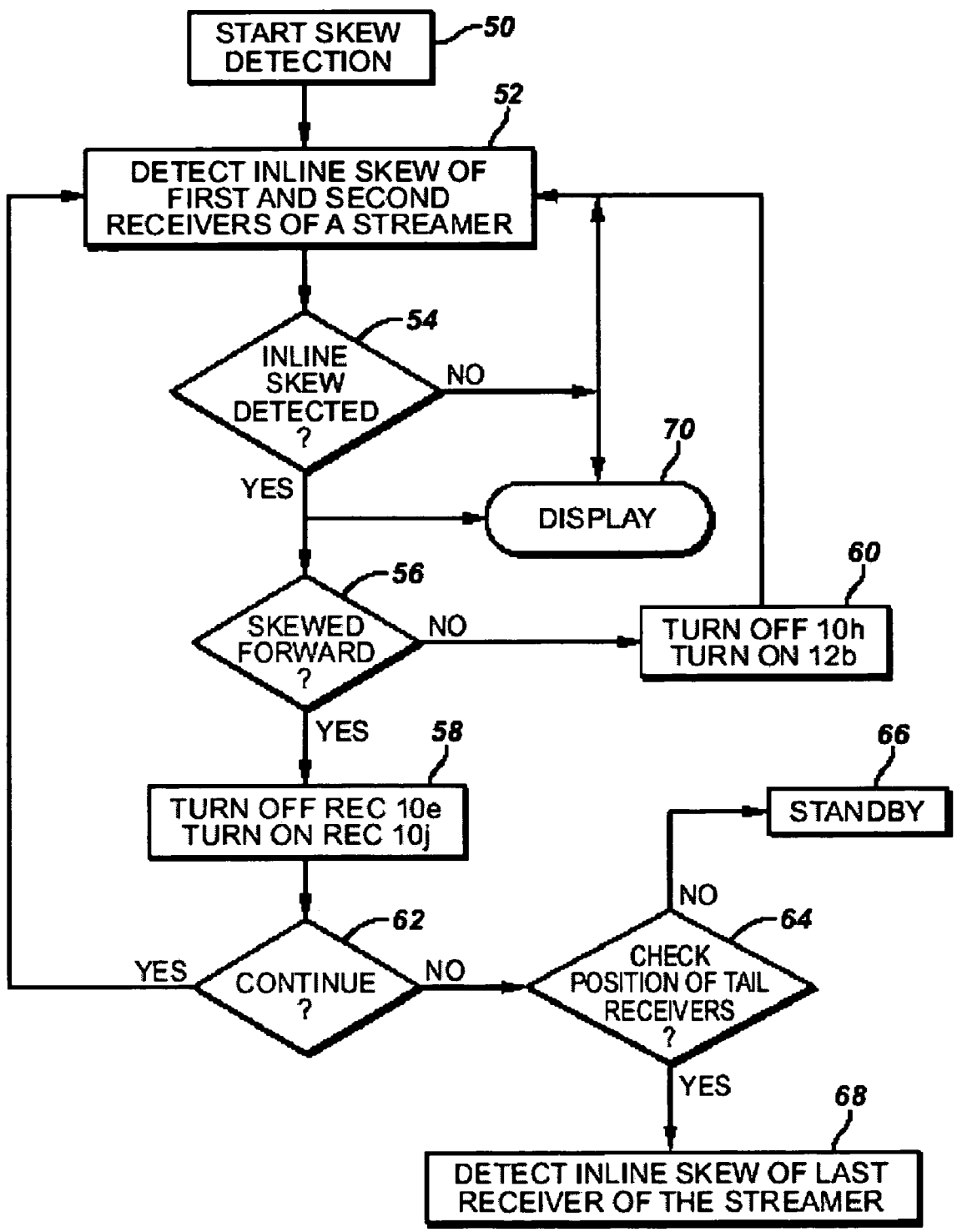
FIG. 5 illustrates a logic diagram for carrying out a method of the invention.

FIG. 5 illustrates one logic diagram useful for visualizing implementation of the invention in conjunction with the embodiment described in of FIGS. 1 and 2. Although the logic is described for inline skew detection, the invention is not so limited. Skew detection is started for streamer 4, visually depicted by box 50, and inline skew is detected, represented by box 52, for the first receiver 10e, and optionally second receiver 10a. A controller or other logic device 54 asks a first question, "Has inline skew been detected?" If yes, the same or another logic device asks a second question, "Is the streamer skewed forward?" If the answer to the first question is "no", in other words the sensed skew is zero or within acceptable limits set by the survey team, then the system returns to box 52 and will ask the first question again, either continuously, or at some defined sampling rate set by the survey team. In any case, the "no" result may be displayed to the survey team on a display device 70 as a trend line or some other indication that the streamer is following the path for which it was meant to follow. If the answer to the second question posed by logic device 54 is "yes", in other words some forward skew is detected outside of acceptable limits, the system turns off receiver 10e or just does not use its results, and a spare receiver 10j is turned on (FIG. 2). The system and method proceeds to ask a third question at logic box 62, "Continue?", and if yes, returns to box 52. If the answer is "no", the system asks a fourth question at logic box 64, "Check skew of tail receivers?" If no, the system may go into standby mode 66, or if yes, proceeds to check the inline skew of the tail receiver 10h as indicated at box 68, or may return to box 52 (not shown). If the answer to the second question is "no", there is no forward skew, this is interpreted to mean there is aft skew, so the system instructs receiver 10h to turn on and receiver 12b to turn off, and the system loops back through boxes 52, 54, and 56. There are of course many options in the control logic as far as the queries, redundancy, visual and audible indicators, and the like, and these are considered within the invention. For example, the system and methods of the invention may check both the first receiver and the last receiver simultaneously. There may be multiple control loops for multiple streamers, and a host or supervisory computer may supervise the inline skew detection.

Figure 6:
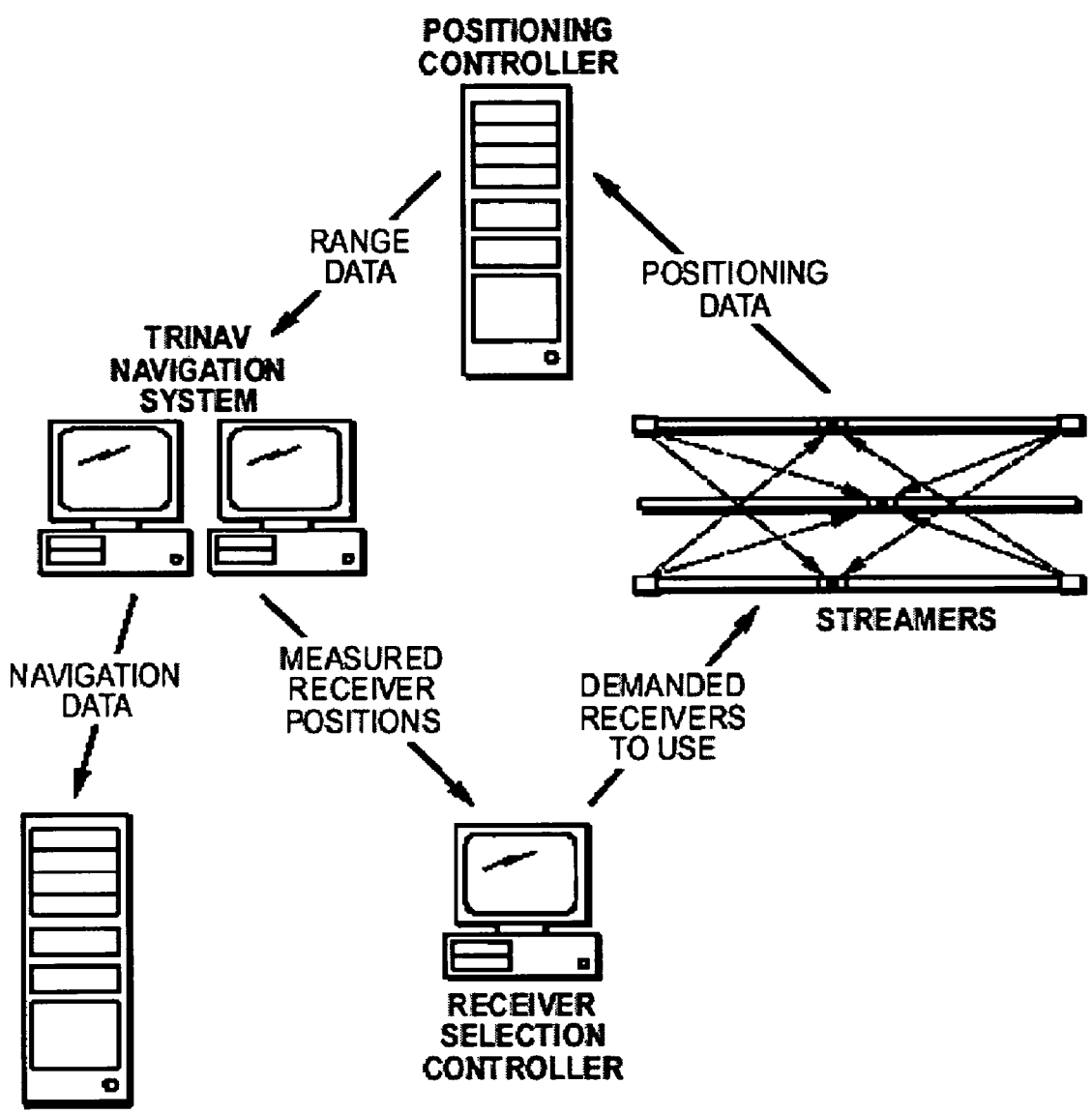
FIG. 6 illustrates one embodiment of a streamer positioning system which may be used in detection of inline skew of streamers.

FIG. 6 depicts schematically one embodiment of how the inline skew detection system might be used in conjunction with a streamer positioning system and method. Positioning data from the streamers may be fed to a positioning controller, which calculates receiver positions in terms of ranges, or distances, between hydrophones. One useable positioning system, that known under the trade designation Q-MARINE, from WesternGeco L.L.C., deploys a full acoustic network along the entire streamer length. Receiver positioning may be calculated to within 4 meters anywhere along the streamer. In addition to range information from the tail and front networks, a full-streamer network may calculate ranges at hundreds of intermediate points. A navigation system, such as that known under the trade designation TRINAV, also available from WesternGeco L.L.C., may use the ranges to calculate actual positions of receivers, which are recorded as navigation data, and may also pass the receiver positions to a receiver selection controller to select changes in receivers used, if required. By using a communication system, either hardwire or wireless, information from the remote receiver selection controller may be sent to one or more receivers. The receivers in turn are either turned on, remain on but not used, turned off, or remain off, as desired to maintain inline skew within acceptable limits.

Reliable receivers are important in carrying out the invention. For example, acoustic receivers may vary in their sensitivity. To solve the problem of receiver sensitivity variation, receivers having high-fidelity tubular hydrophones with tight and stable sensitivity specifications may be used. Hydrophones typically experience hydrostatic pressures that may affect sensitivity over time, or even destroy the sensors. Newer hydrophones have much higher survival-depth tolerances and more stable sensitivities because they are pre-aged in the manufacturing process and perform consistently thereafter. Each hydrophone may have its own calibration certificate, and all sensitivity values may be stored in the streamer electronics for automatic data calibration. Svendsen M and Larsen L: "True 4D-Ready-Seismic Utilizing Q-Marine," paper OTC 13163, presented at the Offshore Technology Conference, Houston, Tex., USA, Apr. 30-May 3, 2001. With recent advances in electronics and fiber optic networks, systems may record more than 4000 hydrophones per 12-km [8-mile] streamer on up to 20 streamers, for a maximum of 80,000 channels. The resulting 4-fold increase in bandwidth capacity compared with conventional acquisition systems opens the possibility of bringing raw point-receiver data up to the vessel for advanced processing with digital group forming algorithms, rather than relying on the convention analog group forming methods. However, either digital or analog group forming methods, or some combination thereof, may be used in practicing the present invention. The inline skew data acquisition system may utilize an acoustic ranging system along the full length of the streamer. Distinctive acoustic sources spaced along the streamers (for example, every 800 m [2600 ft]) may emit signals that can be recorded at any seismic hydrophone. The relative timing of each arrival allows a set of ranges, or distances between source and hydrophone, to be computed across the entire network, if desired. The acoustic ranges may be used as input to a ranging-network adjustment that extends between GNSS readings. The result is an absolute positioning accuracy to within 4 m [13 ft] anywhere along the streamers, and this may be used in the receiver selection routine to avoid having to move a streamer.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, no clauses are intended to be in the means-plus-function format allowed by 35 U.S.C. §112, paragraph 6 unless "means for" is explicitly recited together with an associated function. "Means for" clauses are intended to cover the structures described herein as performing the recited function and not only structural equivalents, but also equivalent structures.

What is claimed is:

1. A system comprising:
    (a) a seismic streamer including a plurality of receivers;
    (b) a skew detector configured to detect inline skew of the streamer; and
    (c) a receiver selector configured to select which receivers in the streamer to use in data acquisition based on the detected streamer inline skew.

2. The system of claim 1 comprising multiple streamers.

3. The system of claim 2 wherein the skew detector is included in a streamer position determination system.

4. The system of claim 3 wherein the streamer position determination system comprises components selected from one or more acoustic ranging networks, components of a Global Positioning System, magnetic compasses, and combinations thereof.

5. The system of claim 2 wherein the receiver selector selects which receiver in the streamer is the first receiver.

6. The system of claim 2 wherein each streamer has N normal receivers and M redundant receivers.

7. The system of claim 6 wherein the M redundant receivers are split between M1 receivers at the front of the streamer and M2 receivers at the tail end of the streamer.

8. The system of claim 7 wherein M1 equals M2.

9. The system of claim 7 wherein M1 does not equal M2.

10. The system of claim 4 wherein the streamers include sufficient acoustic transmitters and receivers to perform acoustic ranging.

11. The system of claim 1 wherein the skew detector includes one or more skew sensors selected from optical sensors, photoelectric sensors, acoustic sensors, and combinations thereof.

12. A method comprising:
    (a) towing a seismic streamer having receivers;
    (b) sensing inline skew of at least a portion of the streamer;
    (c) selecting the receivers to use in seismic data acquisition using the sensed inline skew; and
    (d) acquiring seismic data with the selected receivers.

13. The method of claim 12 comprising towing a plurality of streamers.

14. The method of claim 13 wherein sensing the skew is included within a method of sensing streamer position.

15. The method of claim 14 wherein the streamer positioning comprises acoustic ranging.

16. The method of claim 13 wherein said selecting the receivers to use in data acquisition includes selecting a first receiver in each streamer.

17. The method of claim 13 wherein said selecting the receivers to use comprises selecting a spare receiver in at least one spare streamer section to be a first receiver.

18. The method of claim 16 wherein when the sensing of inline skew occurs continuously, the selecting of the receivers to use occurs continuously.

19. The method of claim 12 wherein the receivers comprise N normal receivers and M redundant receivers.

20. The method of claim 12, further comprising the step of providing a skew detector configured to determine the inline skew of the streamer.

21. The method of claim 20 wherein the skew detector includes one or more skew sensors selected from optical sensors, photoelectric sensors, acoustic sensors, and combinations thereof.

22. The method of claim 19 wherein the M redundant receivers are split between M1 receivers at the front of the streamer and M2 receivers at the tail end of the streamer.

* * * * *